United States Patent Office 2,759,569
Patented Aug. 21, 1956

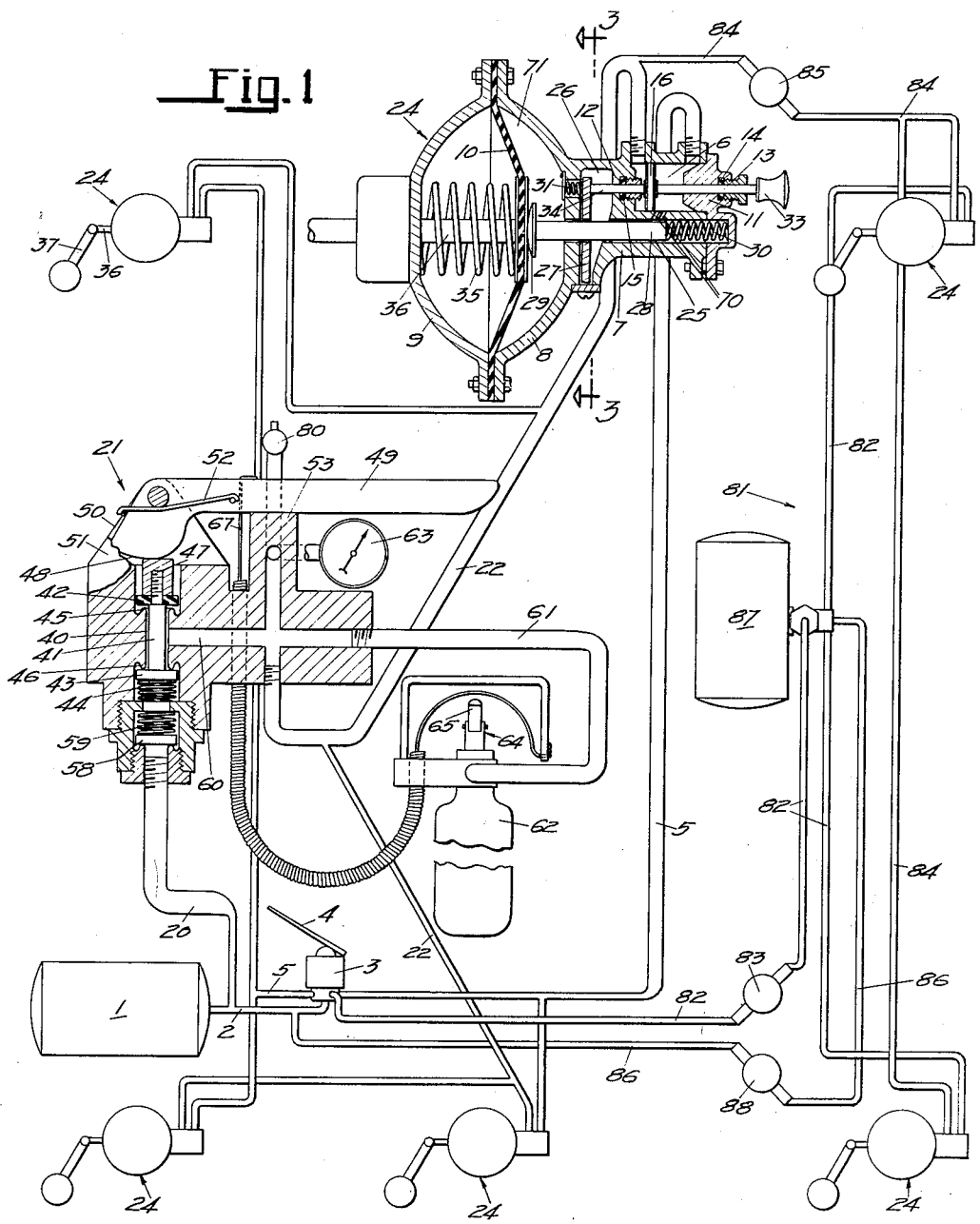

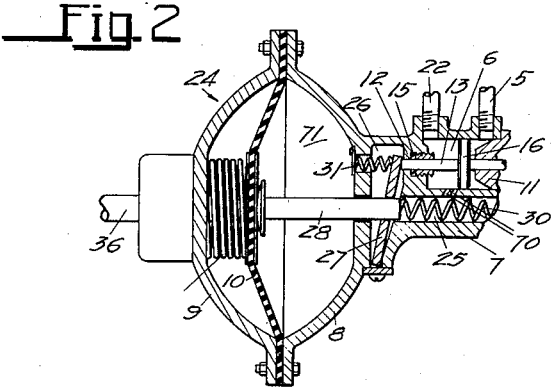

2,759,569

EMERGENCY AND PARKING BRAKE SYSTEM, INCLUDING MECHANICAL LOCKING MEANS IN FLUID ACTUATED BRAKES

Warner L. Keehn, Santa Rosa, Calif., assignor to Keehn-O Manufacturing Company, a corporation of Nevada Application March 31, 1953, Serial No. 345,888

4 Claims. (Cl. 188—152)

This invention relates to fluid actuated brakes and has for one of its objects the provision of mechanical locking means for the brakes in such a system that will insure against unintentional release of the brakes when they are applied for substantial periods of time, such as occurs when vehicles, such as trucks, are parked for loading or for unloading or for any purpose, and another object of the invention is the provision of locking means such as above described that cannot be unintentionally or accidentally unlocked unless the conventional fluid pressure system is operative for applying the brakes in case such application is required.

A still further object of the invention is the provision of an auxiliary source of fluid under pressure in a fluid pressure braking system that will enable the operator to unlock the automatic mechanical brake lock of the present invention in the event the main source of fluid under pressure is exhausted.

In the following explanation reference will be made to "air" rather than the more inclusive word "fluid" inasmuch as the invention as illustrated in the drawings is particularly suitable to air brake equipment and is shown in an air brake system.

Accidents frequently occur, and are always imminent, where vehicles, such as trucks, are parked and held solely by the force of the air that actuates the brakes. Many States recognize the likelihood of such accidents by compelling some safety measure in the event the air leaks away and the available pressure is too low to be effective in holding the vehicle or in stopping it if it should start to move. In some instances where trucks are parked on level places for a number of hours without replenishment of the source of compressed air, there is virtually no air pressure and the brakes will be inoperative until the air pressure has been built up to the point where it will actuate the brakes. If such trucks are moved after their engines have been started but before adequate air pressure exists in the tanks, they cannot be stopped.

By the present invention this is virtually impossible for the reason that adequate air pressure to actuate the brakes must exist before the brakes can be released, and the brakes will remain applied with the same force that was used to stop and to hold the truck until sufficient air pressure is available to stop and to hold the truck. In the event the air pressure system is damaged or cannot be restored and there is no available gas under pressure to release the brakes, the present invention provides for means for mechanically releasing the brakes.

Other objects and advantages will appear in the description and in the claims. One such object is the provision of an attachment that is readily and easily attached to the conventional diaphragm housing of a conventional air brake system thus enabling the present system to be quickly and economically converted to one in which all of the advantages of the present system are had. It may also be mentioned that provision for the release of air upon release of the brakes is positive and assured in the present system.

In the drawings:

Figure 1 is a part schematic and part actual view in which the general brake system in a truck and trailer are shown with one of the brake locking means being enlarged and shown in detail, and with the control means also shown in detail.

Figure 2 is a fragmentary enlarged sectional view of a portion of a brake locking means shown in Figure 1 in which the brake locking means is in locked position.

Figure 3 is an enlarged sectional view taken along line 3—3 of Figure 1.

Figure 4 is an enlarged sectional view of the piston shown in the brake locking means of Figure 1.

In detail, a main source of fluid under pressure 1 is in the form of a tank filled with air under pressure, which air is provided by the usual compressor. This tank, as illustrated, is for a vehicle, such as a conventional truck, and which may or may not have a trailer. The system shown in Figure 1 provides for the trailer.

A pipe 2 leads from the tank 1 to a usual foot actuated brake valve 3 that is provided with a foot pedal 4. A pipe 5 connects valve 3 with one end of a cylindrical chamber 6 that is formed in a projection 7 that, in turn, is integral with one side 8 of a diaphragm housing. The other side 9 of said housing is conventional, as is the diaphragm 10.

It is to be understood that there is a diaphragm housing and the other elements such as projection 7 and the elements contained therein for each brake on the vehicle, and in this connection, the diaphragm and the side 9 are conventional.

One end wall 11 of the cylindrical chamber 6 is formed with a central passageway coaxial with the said chamber and the opposite or inner end wall 12 which is nearest the diaphragm housing is also formed with a central passageway. A piston rod 13 extends reciprocably through the passageways in the ends of the cylindrical chamber 6 and packing glands 14, 15 are respectively provided in said end walls and through which said piston passes to prevent leakage of air around said rod.

A piston 16 is on rod 13, which piston may be of any suitable sealing or plastic material, such as "neoprene" that forms a sealing contact with the walls of the cylindrical housing. The piston may be held between washers 17, 18 that, in turn, are secured to said rod at opposite sides of the piston (Figure 4). Thus upon air under pressure being admitted into the chamber 6 through pipe 5 the piston and rod 13 will be driven to the left, as seen in Figure 1, and if air is admitted into the opposite end of the cylindrical chamber 6, the piston will be driven to the right, provided air is exhausted from the right hand end of said chamber.

A pipe 20 connects with the pipe 2 at a point between tank 1 and valve 3, therefore said pipe 20 has air under tank pressure therein at all times. This pipe 20 connects said pipe 2 with an emergency control valve that is generally designated 21 and a pipe 22 connects said valve with the end of the cylindrical chamber 6 that is opposite the end with which pipe 5 is connected. Thus, a means is provided for driving the piston 16 and rod 13 to the right.

Before describing the control for the piston 16, the further structure of the brake actuating device, that will be generally designated 24 and that includes the diaphragm housing and projection 7, will be described in detail.

Below or to one side of the cylindrical chamber 6 is a passageway 25 that is coaxial with the diaphragm 10 and this passageway is formed in projection 7. Also formed in said projection adjacent to the side 8 of the diaphragm chamber, is a lock retaining chamber 26 in which is a lock in the form of a plate 27 that provides a locking means for a rod 28.

The said plate 27 is formed with an opening that may be slightly elliptical (vertically), and through which rod 28 loosely passes, and the side 8 of the diaphragm chamber is also formed with an opening through which rod 28 passes. The end of said rod that is within the diaphragm chamber is formed with a head 29 that engages the diaphragm 10 centrally of the latter.

An expansion spring 30 reacts between the end of rod 28 that is opposite head 29 and the closed end of the passageway 27 for constantly and yieldably urging said rod into engagement with the diaphragm 10.

The said passageway 25 and the opening in side 8 of the diaphragm chamber through which rod 28 passes, is sufficiently large relative to the rod 28 to permit air entering said passageway to flow into the diaphragm chamber at the side adjacent to wall 8.

The plate 28 through which rod 27 passes is tiltable in chamber 26 about its lower end. When the plate or lock 27 is vertical and flat against the wall 8, the rod 28 is freely reciprocable in opposite directions. An expansion spring 31 in a recess in wall 8 reacts between the upper end of said locking plate and the closed end of said recess to urge the upper end of the locking plate in a direction away from the side 8. Thus rod 28 can at all times be readily moved with diaphragm 10 and under the influence of spring 30 in the direction of the side 9 of the diaphragm chamber, but when a reverse movement of the rod occurs, the plate 27 will be tilted under the influence of spring 31 to engage the rod at the upper and lower edges of the aperture in said plate and the rod will be positively locked against such reverse movement until it is again moved to vertical position as seen in Figure 1.

The piston rod 13 extends at one end out of the body or projection 7, as indicated at 33 and the other end 34 projects into the lock retaining chamber 26 in line with the flat side of the upper end of lock 27. It will thus be seen that when rod 13 is moved to the left (as seen in Figure 1) the end 34 will engage the upper end of lock plate 27 and will swing it to vertical position (if it is in locking position) to thereby release rod 28.

An expansion spring 35 reacts between the diaphragm 10 and the diaphragm wall 9 for urging the diaphragm 10 to the right, or toward the side wall 8 of the diaphram chamber, and brake actuating rod 36 extends through wall 9 and is movable with the diaphragm. This rod 36 is connected with the brake arm 37 in the usual manner for applying the brake when the diaphragm 10 is moved under fluid pressure to the left (as seen in Figure 1). When the fluid pressure is relieved, the spring 35 will cause diaphragm 10 to be moved to the right and the brake will be released.

Referring now to the emergency control valve 21, this valve comprises a main body formed with an open ended passageway 40 in which a valve stem 41 is loosely reciprocable. This stem 41 has an upper valve element 42 and a lower element 43 secured thereto for reciprocation therewith and a spring 44 yieldably urges said stem and the elements 42, 43 upwardly so that the element 42 is elevated off valve seat 45 and element 43 is seated against seat 46 the said seats being at vertically spaced points within said passageway. Projecting from the upper end of passageway 40 is a button 47 on stem 41 that is adapted to be engaged by the cam surface 48 on one end of a manually actuated handle 49. Said handle is pivotally secured to ears 50 at 51 and a torsion spring 52 connects said handle to said ears for yieldably holding the handle against a stop 53 and for holding the cam surface 48 in a position in which the stem is elevated by a spring 44 so that button 47 is against said cam surface when the element 42 is spaced from seat 45, and when element 43 is against seat 46.

The lower end of passageway 40 communicates with pipe 20, which pipe, as stated before, is in direct communication with the fluid under pressure in tank 1 hence will hold valve element 46 seated as long as there is pressure in tank 1.

A check valve 58 is in passageway 40 between valve element 43 and the pipe 20, which valve will open to fluid pressure in pipe 20, but is urged to closed position by spring 59 and superior fluid pressure in passageway 40.

A passageway 60 within the valve body communicates with passageway 40 at a point between the elements 42, 43 which passageway communicates with the pipe 22 that, in turn, opens into the left hand end of the cylindrical chamber 6 (as seen in Figure 1). Said passageway 60 also connects by a pipe 61 with a tank 62 of $CO_2$ within which the $CO_2$ may reach a pressure of 800 lbs. per square inch, and a pressure gage 63 may also communicate with passageway 60.

A conventional valve 64 on the conduit 61 is provided with a lever 65 or the equivalent for opening the valve against the resistance of a spring (not shown), such valve and arm being conventional equipment with such a tank.

Connected with handle 49 is one end of the wire 67 of a conventional Bowden cable, the sheath of which is secured to the valve body. The other end of said wire is secured to a bracket that mounts tank 62 and which wire extends arcuately over the lever 65 and is spaced from the latter so that the said wire will move the lever to open the valve 64 only after the handle 49 has been swung a sufficient distance to cause the valve element 42 to seat on the seat 45, and a predetermined time after valve element 43 has moved away from seat 46. It is noted that the cam surface 48 is such that the swinging of arm 49 away from the stop 53 will result in the stem 41 being moved downwardly.

In operation, it will be seen that when the operator depresses the conventional brake pedal 4, air from tank 1 will flow through pipe 5 into the right hand end of the chamber 6 and through ducts 70 between said chamber 6 into passage 25 and from there into the diaphragm chamber 71 thus causing the diaphragm to move to the left against the force of spring 35 for applying the brakes. The piston 16 in chamber 6 will also be moved to the left, hence rod 28 is free to reciprocate. This operation of the brake is identical with the present operation.

In the event the truck or vehicle is to be parked, with the brakes applied, the brakes are applied by moving handle 49 sufficiently to unseat the valve element 43 only, with the result that air under pressure will pass through the pipe 22 into the left hand end of the cylindrical chamber 6 causing the piston 16 and rod 13 to be moved to the right so that the piston will move across the ports 70 to enable the air from line 22 to enter the diaphragm chamber and to move the diaphragm for applying the brakes. As soon as the handle 49 is released, the lock 27 will engage the rod 28 to lock the brakes in their applied position, and the air in the cylindrical chamber 6 at the left of piston 16 will be released past element 42 in the manually actuated valve structure. This release of air is necessary to prevent possible entrapment of air at the left side of piston 16.

In order to release the lock, it is necessary that tank 1 have sufficient air pressure to move the piston 16 and rod 13 to the left so that the end 34 of rod 13 will again push plate or lock 27 against the resistance of spring 31 to the position shown in Figure 1. If the tank 1 is empty, the brakes can only be released by striking the exposed end 33 of each rod with an implement or by manual manipulation. This latter course is relatively difficult since each brake must be unlocked, but such difficulty in releasing the brakes insures against accidental release, or an easy release such as would tempt an operator to drive the truck without adequate air pressure for stopping it. Usually a manual release of the brakes is necessary only when the vehicle is incapacitated and must be towed and when the brakes are locked.

The brakes are normally released by applying air to the right hand end of each cylindrical chamber through depression of the foot pedal 4 that will pass air through line 5 to said chamber, causing the piston 16 and rod 13 to be moved to the left or to the position shown in Figure 1.

Normally there is a leakage of air in air brakes and in many instances the air in the compressed air tank or tanks of a truck is lost during overnight or relatively long parking and when the compressor is idle. It frequently happens that the driver will start out with a truck before there is adequate air pressure in the tanks to operate the brakes, and accidents occur because the truck cannot be stopped. With the present device the mechanical brake lock cannot be released by a driver in the cab unless there is sufficient air to operate the brakes, and in parking the vehicle the brakes cannot be released even though all air is exhausted from the air tank, until adequate air is available for actuating the brakes.

In the event a truck or vehicle is parked where no air is in the compressed air tank, it is only necessary to pull the lever 49 a sufficient distance to open the valve in the $CO_2$ tank 62, and the $CO_2$ gas under pressure will function to apply the brakes and to move each piston 16 and rod 13 to the right for releasing each lock 27 so the latter will automatically grip each rod 28 for holding the brakes applied. Also should extra pressure be desired for applying the brakes even where there is air under pressure, the reserve of $CO_2$ gas can be used. The pressure in tank 62 may run as high as 800 lbs. per square inch, which is many times more than the maximum air pressure in tank 1. In this connection it is pertinent to note, however, that by manipulation of handle 49, as little or as much of the $CO_2$ gas pressure as desired, can be used.

It has already been explained that the present system does not require any changes in the brake structure of each brake other than substitution of the side 8 of the diaphragm housing for the present side of said diaphragm. The $CO_2$ tank or any other suitable source of gas under pressure and valve 21 are added to the present system, as are lines 20 and 22.

The trailer brakes may be of the same structure as those already described for the truck, and in connection with the truck and trailer brakes, except for the enlarged sectional view in Figure 1, they are diagrammatically indicated. The line 22 from the $CO_2$ tank connects with each brake, and the front brakes may be of identically the same structure as the rear brakes and the trailer brakes. The only requisite is that the lines 20, 22 connect with each brake as has been described for the brake illustrated in detail in Figure 1.

On valve 21 a pop-off or safety valve 80 and a pressure gage 63 may be provided. The safety valve may be set to relieve the pressure in line 22 so that unintentional damage will not be done to the diaphragms should the operator actuate the valve on the $CO_2$ tank too rapidly. The said valve 80 may be set to prevent the pressure in line 22 to each brake rising above say 150 or 175 lbs. per square inch, according to the safety factor of the diaphragms.

The trailer brake arrangement 81 is similar to the truck brake arrangement but requires three pipes. Pipe 82 from brake valve 3 services the trailer brakes with air from tank 1 in the same manner as pipe 5 services the truck brakes except that pipe 82 is detachably connected at connector 83 between the truck and trailer. Pipe 84, with connector 85 intermediate its ends, connects pipe 22 with the trailer brake chambers 6 at the appropriate side of piston 16 (opposite pipe 82). The third pipe 86 connects pipe 2 with trailer reserve tank 87 in a conventional manner, pipe 86 having detachable connector 88 intermediate its ends.

While attention has been directed to the fact that the gas in the $CO_2$ tank is normally used to apply the brakes when there is no air in the compressed air tank, and may also be used in combination with the air in the compressed air tank in making a stop, it should also be noted that with the present arrangement the $CO_2$ gas or auxiliary source of compressed fluid is available for making an emergency stop should the main source be lost.

The use of the word "diaphragm" in the claims does not necessarily mean a diaphragm of the type shown in the drawings, but also refers to the piston type since the operation is substantially the same. Also the means that is movable with the diaphragm for applying the brakes is not necessarily restrictive to the precise structure shown, since it may be some element intermediate the diaphragm and the brakes. The structure disclosed is the preferred form only. The accomplishment of the final result of holding the brakes by mechanical means, and the requirement of adequate fluid pressure to apply the brakes before the mechanical lock can be released, may be accomplished by modification of the present structure and the claims are intended to cover such modifications as come within their scope.

I claim:

1. In a brake system including a diaphragm operatively connected with the brake applying rod of a brake for movement in one direction under fluid pressure applied to one side of said diaphragm for applying said brake and movable under spring force in an opposite direction for releasing such brake when said fluid pressure is released, a wall extending over said one side of said diaphragm defining a side of a fluid pressure chamber with said diaphragm defining the opposite wall of such chamber for confirming fluid under pressure against said one side to effect movement of said diaphragm in said one direction, an element projecting from said one side of said diaphragm separate from said brake applying rod supported for movement with said diaphragm and a spring in engagement with said element for holding it in engagement with said diaphragm, a plate having an aperture through which said rod extends relatively loosely means supporting said plate at a point spaced from said aperture for swinging of said plate from a released position perpendicular to said element to an inclined locking position engaging said element in locking relation at opposite edges of said aperture against movement of said diaphragm under the influence of said spring, a spring in engagement with said plate constantly urging the latter to said locking position, a member movable into engagement with said plate for moving the latter to said released position, and fluid pressure actuated means connected with said member for moving said member into said engagement with said plate.

2. In a fluid pressure brake system having a diaphragm actuatable for movement in one direction under the influence of fluid under pressure against one side thereof, said side defining one side of a fluid pressure chamber, a brake operatively connected with said diaphragm for application by said movement of the latter upon fluid under pressure being admitted into said chamber, a main source of fluid under pressure, an auxiliary source of fluid under pressure, brake locking means movable from a locking position releasably holding said brake in applied position to a released position for releasing said brake, and vice versa, fluid pressure actuatable means movable in one direction under fluid pressure to free said locking means from unlocked position for movement thereof to said locking position and movable under fluid pressure in the opposite direction to release said locking means from locking position, a first fluid pressure conduit communicating said auxiliary source with said fluid pressure actuatable means for moving said fluid pressure actuatable means in said one direction, and a second fluid pressure conduit connecting said main source of fluid with said fluid actuatable means for moving said fluid actuatable means in said opposite direction, a first valve for opening and closing said first conduit to flow of fluid therethrough, a second valve for opening and closing said second conduit to flow of fluid therethrough, and means connecting said first valve and said second valve for successive actuation of said second valve and said first valve in that order whereby said locking means will be inoperative for locking said brakes until said first valve is actuated.

3. In a fluid pressure brake system having a diaphragm actuatable for movement in one direction under the influence of fluid under pressure against one side thereof, said side defining one side of a fluid pressure chamber, a brake operatively connected with said diaphragm for application by said movement of the latter upon fluid under pressure being admitted into said chamber, a main source of fluid under pressure, an auxiliary source of fluid under pressure, brake locking means movable from a locking position releasably holding said brake in applied position to a released position for releasing said brake, and vice versa, fluid pressure actuatable means movable in one direction under fluid pressure to free said locking means from unlocked position for movement thereof to said locking position and movable under fluid pressure in the opposite direction to release said locking means from locking position, a first fluid pressure conduit communicating said auxiliary source with said fluid pressure actuatable means for moving said fluid pressure actuatable means in said one direction, and a second fluid pressure conduit connecting said main source of fluid with said fluid actuatable means for moving said fluid actuatable means in said opposite direction, a first valve for opening and closing said first conduit to flow of fluid therethrough, a second valve for opening and closing said second conduit to flow of fluid therethrough, and means connecting said first valve and said second valve for successive actuation of said second valve and said first valve in that order whereby said locking means will be inoperative for locking said brakes until said first valve is actuated, a passageway connecting said first fluid pressure conduit with said chamber, said passageway being closed by said fluid pressure actually means when said locking means is in said unlocked position and free from obstruction by said fluid actuatable means to flow of fluid from said first conduit into said chamber when said locking means is in locking position.

4. In a fluid pressure brake system having a diaphragm actuatable for movement in one direction under the influence of fluid under pressure against one side thereof, said side defining one side of a fluid pressure chamber, a brake operatively connected with said diaphragm for application by said movement of the latter upon fluid under pressure being admitted into said chamber, a main source of fluid under pressure, an auxiliary source of fluid under pressure, brake locking means movable from a locking position releasably holding said brake in applied position to a released position for releasing said brake, and vice versa, fluid pressure actuatable means movable in one direction under fluid pressure to free said locking means from unlocked position for movement thereof to said locking position and movable under fluid pressure in the opposite direction to release said locking means from locking position, a first fluid pressure conduit communicating said auxiliary source with said fluid pressure actuatable means for moving said fluid pressure actuatable means in said one direction, and a second fluid pressure conduit connecting said main source of fluid with said fluid actuatable means for moving said fluid actuatable means in said opposite direction, a first valve for opening and closing said first conduit to flow of fluid therethrough, a second valve for opening and closing said second conduit to flow of fluid therethrough, and means connecting said first valve and said second valve for successive actuation of said second valve and said first valve in that order whereby said locking means will be inoperative for locking said brakes until said first valve is actuated, the fluid in said auxiliary source being under greater pressure than the pressure of fluid of said main source.

References Cited in the file of this patent

UNITED STATES PATENTS

| | | |
|---|---|---|
| 710,522 | Sauvage | Oct. 7, 1902 |
| 1,254,246 | Liedloff | Jan. 22, 1918 |
| 1,484,475 | Crown | Feb. 19, 1924 |
| 2,121,366 | Robinson | June 21, 1938 |
| 2,600,758 | Gross | June 17, 1952 |